United States Patent [19]

Maitani

[11] 4,355,874
[45] Oct. 26, 1982

[54] PROGRAM EE CAMERA

[75] Inventor: Yoshihisa Maitani, Hachioji, Japan

[73] Assignee: Olympus Optical Co., Ltd., Tokyo, Japan

[21] Appl. No.: 65,608

[22] Filed: Aug. 10, 1979

[30] Foreign Application Priority Data

Aug. 22, 1978 [JP] Japan .............................. 53-102186

[51] Int. Cl.³ .................. G03B 7/087; G03B 7/12; G03B 17/20
[52] U.S. Cl. ........................................ 354/31; 354/38; 354/45; 354/53
[58] Field of Search .............. 354/26, 29, 30, 36–38, 354/40, 43, 44, 46, 271, 45, 50, 51, 60 R, 31, 53

[56] References Cited

U.S. PATENT DOCUMENTS

| Re. 21,034 | 3/1939 | Karg | 354/43 X |
|---|---|---|---|
| 3,896,460 | 7/1975 | Sahara et al. | 354/38 |
| 3,961,339 | 6/1976 | Akiyama | 354/43 X |
| 4,010,480 | 3/1977 | Sato | 354/44 X |
| 4,062,022 | 12/1977 | Murakami et al. | 354/38 |
| 4,104,654 | 8/1978 | Maitani et al. | 354/31 |
| 4,142,787 | 3/1979 | Ueda et al. | 354/38 |

FOREIGN PATENT DOCUMENTS 52-4827 1/1977 Japan ..................................... 354/36

Primary Examiner—L. T. Hix
Assistant Examiner—William B. Perkey

[57] ABSTRACT

A program EE camera comprises a stop control mechanism for defining the stop extent with a relatively low precision in a few stages according to an electric signal from a light-measuring circuit and a shutter speed control mechanism for controlling a shutter speed in accordance with the stop extent defined by the stop control mechanism.

5 Claims, 20 Drawing Figures

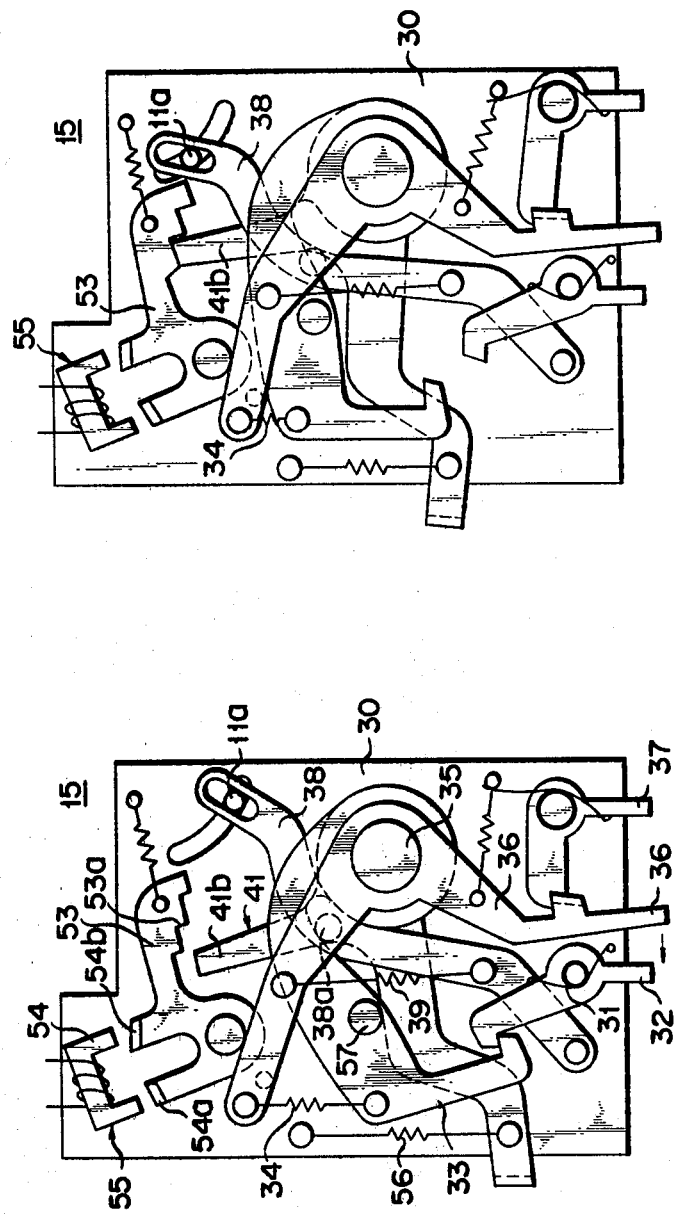

F I G. 11
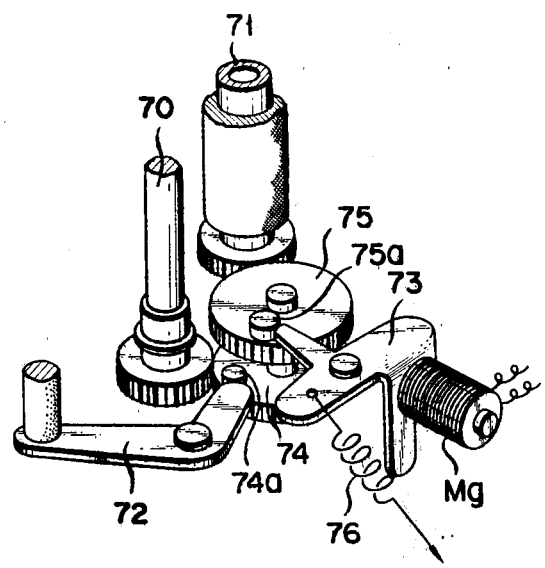

PROGRAM EE CAMERA

BACKGROUND OF THE INVENTION

This invention relates to a program EE camera such as a single-lens reflex camera allowing for the easy exchange of lenses.

The program EE systems are generally known as the simplest type adapted for the beginner of photographing. Most of these systems are only applied to a lens-shutter camera. These systems are fundamentally designed to simultaneously control the F-number and shutter speed, and consequently are unadapted to be applied to a lens-exchangeable single-lens reflex camera. There has already been proposed such type of single-lens reflex camera as allows for the adoption of the program EE system. However, the proposed single-lens reflex camera, in which the F-number of the interchangeable lens is controlled from the side of a camera unavoidably involves a complicated and expensive mechanism, and consequently is accompanied with the drawback of causing the program EE system originally adapted for the beginner of photographing to be only applicable to an expensive camera of extremely complicated mechanism.

SUMMARY OF THE INVENTION

It is accordingly the object of this invention to provide an inexpensive camera of simple arrangement for which the program EE system has been adopted.

The program EE camera of this invention is characterized in that the F-numbers or stop extents included in the factors related to exposure which are defined in accordance with the degree of brightness of a light projected on a foreground subject are initially preset with a relatively low precision in a few stages, and the shutter speed is minutely controlled in accordance with the prescribed one of said F-numbers.

For better understanding of the principle on which this invention is based, comparison is given in FIG. 1 between the exposure factors of the program EE camera of this invention and these of the prior art camera. Referring to FIG. 1, the ordinate denotes the F-number, and the abscrissa shows the shutter speed. A broken A represents the program system of the conventional mechanical shutter; a broke line B the program system of the known electronic shutter; and a solid line C the program system of this invention. With the conventional mechanical shutter, the shutter speed is generally divided into a fast and a slow rate. The stop cam and shutter cam made to swing to a prescribed extent in accordance with the degree of deflection of the meter needle, thereby defining the stop extent and shutter speed. With the above-mentioned shutter, the shutter speed is restricted to two rates due to the specific mechanical arrangement. Further, it is difficult to separate a stop mechanism from a camera body containing a light-sensitive meter. Therefore, the mechanical shutter cannot be applied to an single lens reflex camera, and limits the range of a foreground area in respect of the brightness of a photographed image. On the other hand, the electronic shutter allows photographing to be carried out in a broader foreground area then the above-mentioned mechanical shutter, and can be easily applied as the type which is provided with a member concurrently acting as a stop spring and a shutter spring. However, an attempt to provide a program with the stop spring and shutter spring separately controlled will complicate said control mechnism. An interchangeable lens type camera to which such attemps is applied will unavoidably become extremely expensive. In contrast, the program EE camera of this invention in which the F-numbers are initially preset with a relatively low precision in a few stages is applicable as a single lens reflex camera. In other words, the invention provides an inexpensive program EE camera of simple arrangement which admits of a relatively low precision at which the F-number and the shutter speed are interlocked with each other, allows for the application of the conventional lens, and enables photographing to be carried out in a fully broad foreground area.

BRIEF DESCRIPTION OF THE DRAWINGS

FIGS. 7A to 7D are similar plane views of the different operating conditions of the stop controlling mechanism of the camera to those of FIGS. 4A to 4D;

FIG. 11 ia an oblique view of the shutter control mechanism.

DESCRIPTION OF THE PREFERRED EMBODIMENT

There will now be described by reference to the accompanying drawings a program EE camera embodying this invention.

Figure 2:
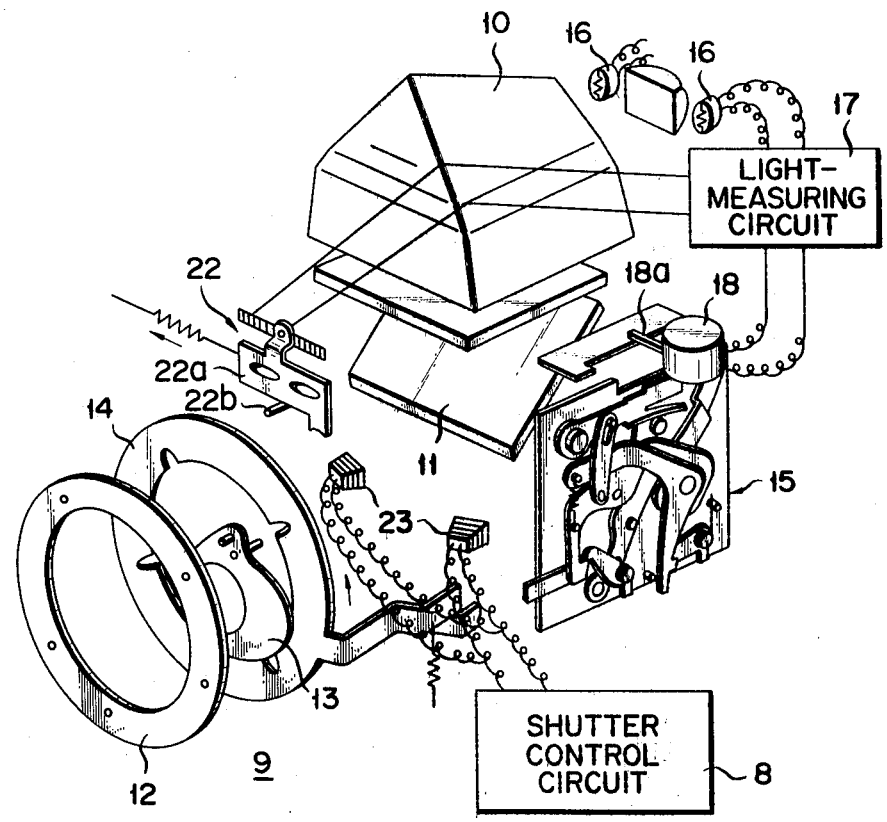
FIG. 2 is a schematic oblique view of the interior of a camera embodying this invention.

Referring to FIG. 2 showing the interior arrangement of the camera except for its body, reference numeral 10 shows part of the finder section.

Figure 1:
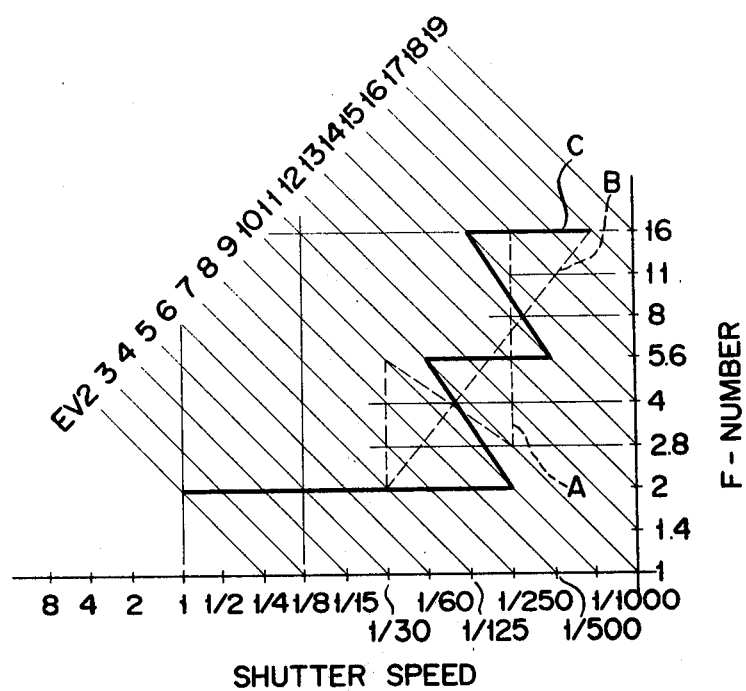
FIG. 1 is a curve diagram comparing the result of applying the fundamental concept on which the program EE camera of this invention is based with the result of operating the prior art cameras.
Figure 3:
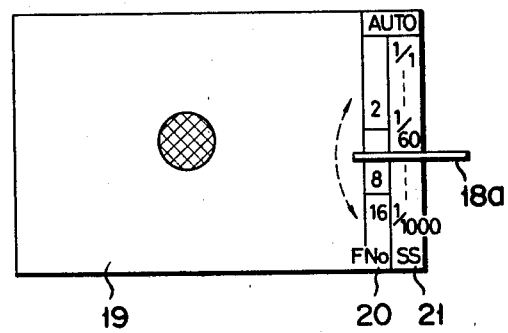
FIG. 3 is a plan view of the finder of the camera.

Provided below the finder section 10 is a swingable mirror 11. This mirror 11 swings upward by the known means at the time of photographing, thereby causing light beams passing through the lens to be projected on a film positioned at the back of the mirror through a focal plane shutter. Projectively set in front of the mirror 11 is an interchangeable lens barrel (not shown). The barrel contains the stop mechanism 9 and a lens (not shown). The stop mechanism 9 is formed of a frame 12, spring 13 and ring 14 as counted from the camera front. The aperture of a lens defined by the stop mechanism 9 can be changed at several different rates (three rates, according to this embodiment) by the later described stop control mechanism 15. The stop extent of the stop mechanism 9 is defined by said control mechanism 15 in accordance with the deflection extent of the needle 18a of a light-sensitive meter 18 which is operated by a light-receiving element for the stop control and display through a light-measuring circuit 17 in accordance with the amount of light received. The meter needle 18a is deflected, as shown in FIG. 3, in accordance with the proper stop extent or F-number 20 and the proper shutter speed 21 indicated in the finder 19. The light-measuring circuit 17 contains a variable resistor 22 whose position is shifted in accordance with the stop extent of the stop mechanism to change its resistance value. As indicated in FIG. 2, the variable resistor 22 is set apart from the light-measuring circuit 17, but constitutes part thereof. Said variable resistor 22 comprises a slider 22a and a pin 22b which is provided in a lens barrel and moves the slider 22a upon receipt of a signal denoting the fully open condition of a lens aperture.

Figure 4B:
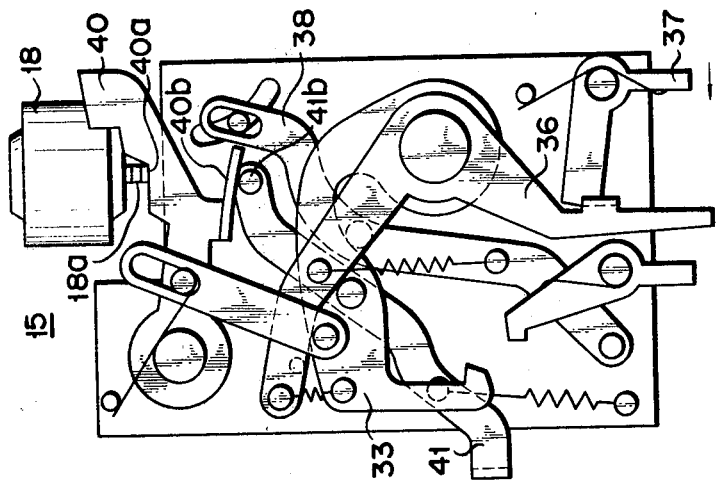
FIGS. 4A to 4D indicate the different operating conditions of a mechanism for controlling the stop extent of the camera.
Figure 4A:
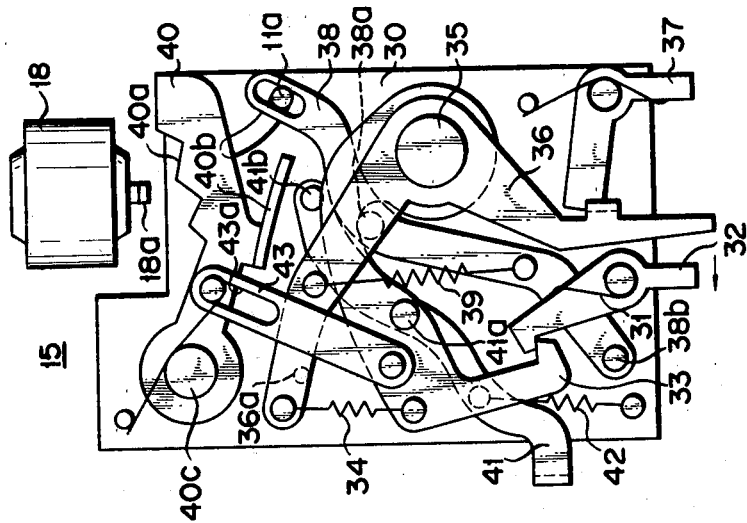
Figure 4D:
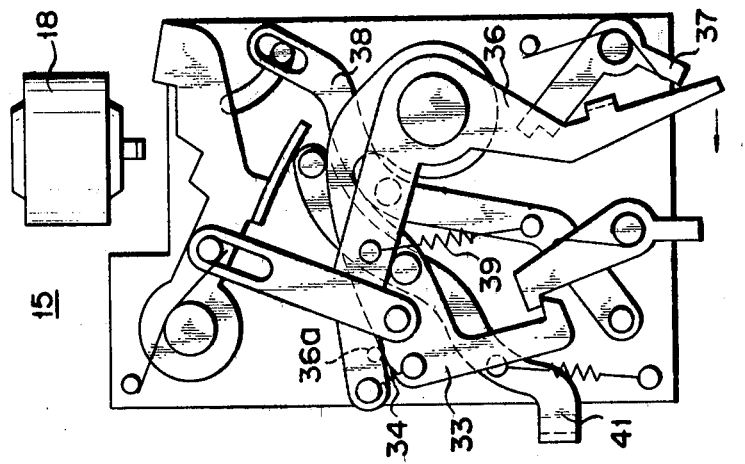
Figure 4C:
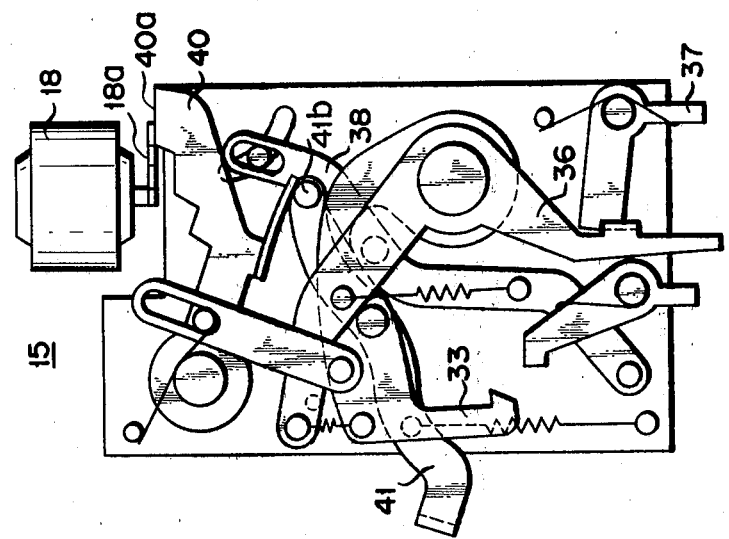

Reference numeral 23 of FIG. 2 shows shutter control light-receiving elements which receive lights reflected from the surface of a film or shutter, and supply the shutter control circuit 8 with an electric signal indicating the amount of light received. There will now be described by reference to FIGS. 4A to 4D the arrangement and operation of the stop control mechanism 15. FIG. 4A shows the condition of a shutter when it is fully charged. FIG. 4B sets forth the condition of the shutter released when a foreground subject is illuminated by light beams having the ordinary degree of brightness. FIG. 4C indicates the released condition of the shutter when a foreground subject is illuminated by light beams having more than an ordinary degree of brightness. FIG. 4D illustrates the condition of the shutter when the travel of the rear curtain is brought to an end. Reference numeral 30 of FIG. 4A denotes a vertical substrate. Rotatably supported on the substrate 30 is an engagement lever 32 which swings clockwise against the force of a spring 31 when the shutter release button is depressed. The engagement end of the engagement lever 32 is engaged with one end of a drive lever 33, restricting the swing of said drive lever 33 against the force of a tension spring 34. A shaft 35 is fitted to the proximity of the other bent end portion of the drive lever 33 to rotatably support it on the substrate 30. The shaft 35 also rotatably supports the central portion of a charge lever 36 on the substrate. Engaged with the proximity of one end portion of the charge lever 36 is a hook 37 which swings when the travel of the rear curtain is brought to an end, thereby releasing said charge lever 36. The other end of the charge lever 36 is engaged with one end of the tension spring 34 of the drive lever 33, and provided with a projecting control pin 36a for restricting the swing of the drive lever 33 beyond the prescribed extent. An engagement recess is formed on one side of a space lying between the other end of the drive lever 33 and shaft 35. An engagement pin 38a projectively provided on a mirror lever 38 is fitted into said engagement recess, thereby restricting the swing of the mirror lever 38. One end portion of this mirror lever 38 is swingably supported on the substrate 30 by means of a pivotal pin 38b. The mirror lever 38 is normally urged for a counterclockwise swing by means of a tension spring 39 stretched between the mirror lever 38 and charge lever 36. The other end of the mirror lever 38 is provided with a slot, into which a drive pin 11a is loosely inserted to effect the swing of the mirror 11 of FIG. 2. A cam plate 40 is swingably supported on the substrate 30 by means of a pin 40C projectively provided at one end of said cam plate 40. The cam surface 40a formed on one side of the other end portion of said cam plate 40 is made to face the needle 18a of the light sensitive meter 18. A bent strip 40b is integrally formed on the opposite side of the cam plate 40 to said cam surface 40a. One end of a stop lever 41 is made to face said bent strip 40b. The central portion of the stop lever 41 is swingably supported on the drive lever 33 by a pin 41a. The other end of the stop lever 41 is connected to the stop mechanism 9 of FIG. 2 for its actuation. Connected to the stop lever 41 is one end of the tension spring 42, the other end of which is swingably supported on the substrate 30 by means of a pin 41b. The tension spring 42 normally urges the stop lever 41 for its counterclockwise swing. Reference numeral 43 denotes a connection lever, one end of which is swingably supported on the drive lever 33, and at the other end of which a slot 43a is formed. A pin projectively provided on the cam plate 40 is loosely inserted into the slot 43a, so that the drive lever 33 and cam plate 40 are connected together for operation.

There will now be described the operation of the stop control mechanism 15 constructed as described above. When the shutter release button (not shown) is depressed while the stop mechanism 9 is in the state of FIG. 4A, then the engagement lever 32 swings in the direction of the indicated arrow against the urging force of the spring 31 to release the drive lever 33. As a result, the drive lever 33 swings clockwise by the force of the tension spring 34, until it is brought to rest by abutment against the pin 36a of the charge lever 36. The above-mentioned swing of the drive lever 33 disengages the pin 38a of the mirror lever 38, to cause said mirror lever 38 to swing counterclockwise by the force of the tension spring 39. Consequently, the mirror 11 swings upward by means of the drive pin 11a. When the drive lever 33 swings, the cam plate 40 whose swing has been obstructed by the connection lever 43 up to this point of time is made to swing counterclockwise. The extent to which the cam plate 40 is allowed to swing is defined, as shown in FIGS. 4B and 4C, by the position of the needle 18a of the light-sensitive meter 18 relative to the cam surface 40a. When the drive lever 33 swings, the stop lever 41 moves therewith up to a point defined by the pin 41b and bent strip 40b. In other words, the position of the stop lever 41 is defined in accordance with that of the meter needle 18a. At this time, the stop mechanism 9 is operated to determine the aperture of the stop mechanism, that is, the F-number.

When the upward swing of the mirror 11 is brought to an end, the front curtain of the focal plane shutter begins to travel by means of the known mechanism. After lapse of a length of time corresponding to the stop extent thus defined and the degree of brightness of a foreground subject, the rear curtain starts a travel to complete exposure. At the end of the travel of the rear curtain, the hook 37 is pushed in the direction of the indicated arrow to release the charge lever 36. As a result, the charge lever 36 swings counterclockwise by means of a spring (not shown). At this time, the drive lever 33 also swings counterclockwise by means of the pin 36a. The swing of the drive lever 33 causes the stop lever 41 and mirror lever 38, as shown in FIG. 4D, to regain their original positions. Accordingly, a lens aperture defined by the stop mechanism 9 is fully opened, and the mirror swings downward.

The charge lever 36 is pushed in the direction of an arrow indicated in FIG. 4D by the take-up of a film and the shutter charge, causing the tension springs 34, 39 to be charged. The above-mentioned charged condition is sustained by engagement between the charge lever 36 and hook 37, thus producing the condition of FIG. 4A.

With a program EE camera provided with the stop control mechanism 15 of the above-mentioned arrangement, light beams sent forth from a foreground subject are received by the light-receiving element 16 for the stop control and display. The needle 18a of the light sensitive meter 18 is moved by an electric signal corresponding to the degree of brightness of the foreground subject. When the shutter release button is depressed, the stop control mechanism 15 causes the cam plate 40 to move to a position facing the needle 18a of the light sensitive meter 18. At this time, the stop mechanism 9 is so operated as to define a stop aperfure corresponding to the shifted position of the cam plate 40. The cam surface 40a of the cam plate 40 is provided with a few stepped sections, which define the stop extent or a stop aperture with a relatively low precision. The cam plate 40 swings to any of the steped section of the cam surface 40a. Said stepped sections respectively represent the case (FIG. 4B) where a foreground subject has an average brightness, the case (FIG. 4C) where the foreground subject has a maximum brightness, and the case (not shown) where the foreground subject has a minimum brightness. The shutter control light-receiving element 23 controls a shutter speed for photographing with a minute precision in accordance with the stop extent defined as described above, that is, the prescribed F-number. As described in connection with the operation of the stop control mechanism 15, the depression of the shutter release button at the time of photographing leads to the upward swing of the mirror 11 and the operation of the focal plane shutter.

With the foregoing embodiment, the cam plate 40 of the stop control mechanism 15 was shifted to a position defined by the needle 18a of the light sensitive meter 18. However, this invention need not be restricted to this arrangement. But the invention may be practised in other modifications, as described below by reference to FIGS. 5 to 9A, 9B. FIGS. 7A to 7D correspond to FIGS. 4A to 4D. The parts of FIGS. 7A to 7D the same as those of FIGS. 4A to 4D are denoted by the same numerals, description thereof being omitted.

Figure 5:
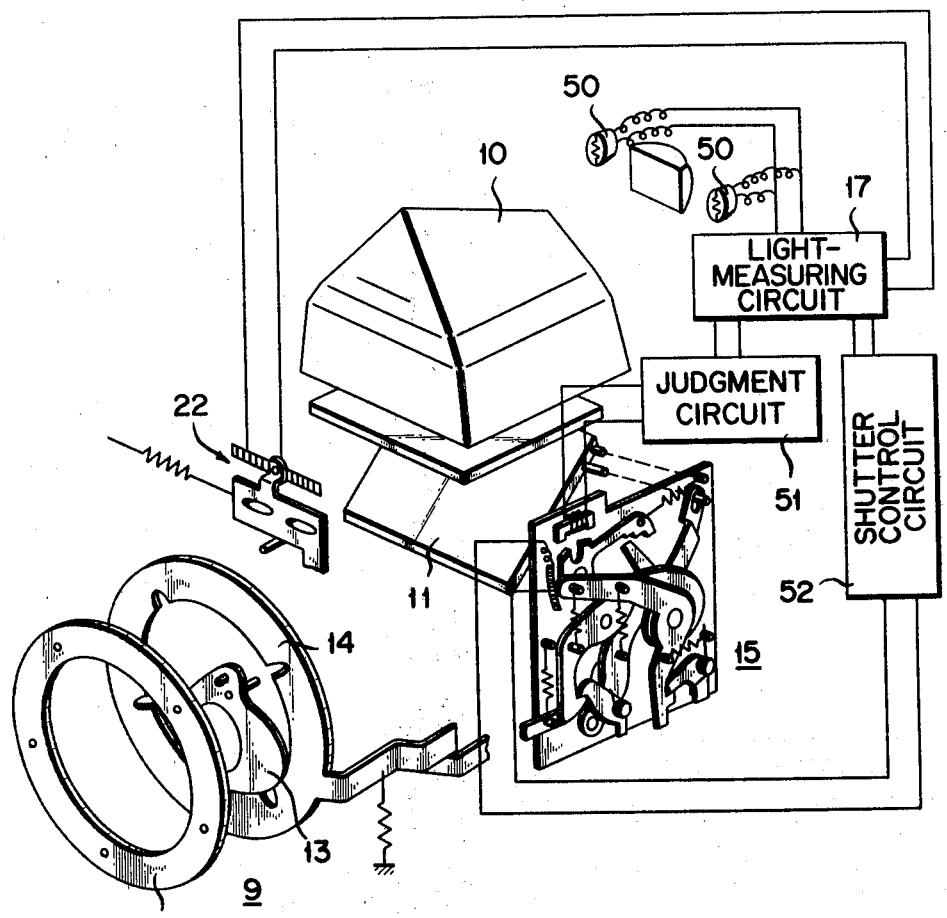
FIG. 5 is a similar oblique view of the camera of the invention to that of FIG. 2.

Referring to FIG. 5, a light-receiving element 50 concurrently used to control the stop extent and shutter speed receives light passing through a lens system. The output side of the light-receiving element 50 is connected to the input side of the light-measuring circuit 17, which in turn generates an electric signal corresponding to a quantity of light received. The output side of the light-measuring circuit 17 is connected to the input sides of the later described judgment circuit 51 and shutter control circuit 52. The judgment circuit 51 roughly classifies the stop extent or stop aperture defined by the stop control mechanism 15 into a few levels. The shutter control circuit 52 minutely controls the shutter speed in accordance with the defined stop extent and quantity of light received.

Figure 6:
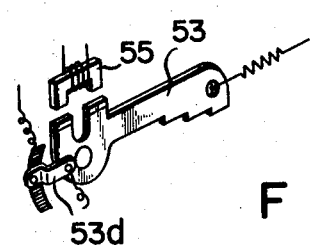
FIG. 6 is an oblique view of the cam plate and index memory of the camera.

Referring to the stop control mechanism 15 of FIG. 7A, one end of the cam plate 53 is swingably supported on the substrate 30. One side of the other end portion of the cam plate 53 is provided with a 3-step cam surface 53a, which faces the cam section 41b of the stop lever 41. The opposite side of said one end portion of the cam plate 53 to the pivoted side is integrally provided with a pair of parallel arms spaced from each other at a prescribed interval. The projecting end planes of the paired arms are fitted with permanent magnets 54a, 54b. The cam plate 53 is further provided with a finder memory needle 53d (FIG. 6). Fixed to the surface of the substrate 30 is a U-shaped core 54, one side of which is provided with a pair of arms whose end planes spetially face the permanent magnets 54a, 54b. A winding connected to the judgment circuit 51 is mounted on the U-shaped core 54 to constitute an electromagnet 55. The stop lever 41 is provided at one end with the cam section 41b facing the cam surface 53a of the cam plate 53. The stop lever 41 is swingably supported at the center by the shaft 35 which also pivotally supports the drive lever 33 and charge lever 36. The other end of the stop lever 41 is connected to the stop mechanism 9. The stop extent is defined in accordance with the degree to which the stop lever 41 swings. The stop lever 41 swings clockwise by the urging force of a tension spring 56. When the shutter is charged, the swing of the stop lever 41 is obstructed by a pin projectively provided on the drive lever 33 (FIG. 7A).

Figure 7D:
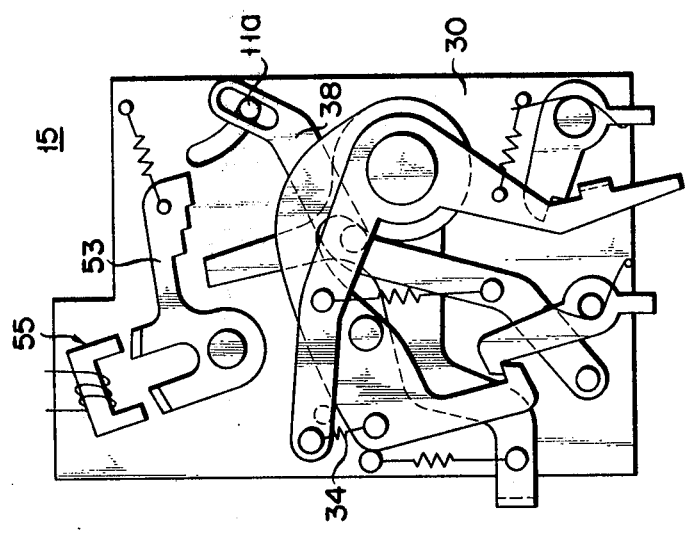
Figure 7C:
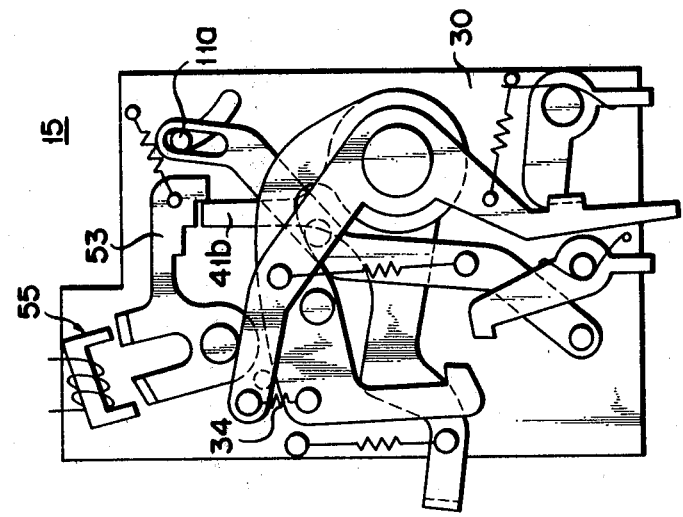

Where, with the stop control mechanism 15 arranged as described above, the shutter release button is depressed, the drive lever 33 swings counterclockwise as in the foregoing embodiment. As a result, the stop lever 41 swings clockwise, and the mirror lever 38 swings counterclockwise, thereby effecting the determination of the stop extent and the upward swing of the mirror 11. The stop extent is defined by the later described judgement circuit 51 in accordance with the supply or nonsupply of power to the electromagnet 55 determined from the degree of brightness of a foreground subject, the direction in which current runs through said electromagnet 55 in case of power supply and the manner in which the cam surface 53a of the cam plate 53 and the cam section 41b of the stop lever 41 abut against each other, while the cam plate 53 swings through the three stepped sections of the cam surface 53a. FIG. 7B denotes the stop extent when a foreground subject has an intermediate degree of brightness, that is, when the F-number indicates, for example, 8. FIG. 7C represents the stop extent when a foreground subject has a maximum degree of brightness, that is, when the F-number shows, for example, 16.

Figure 8:
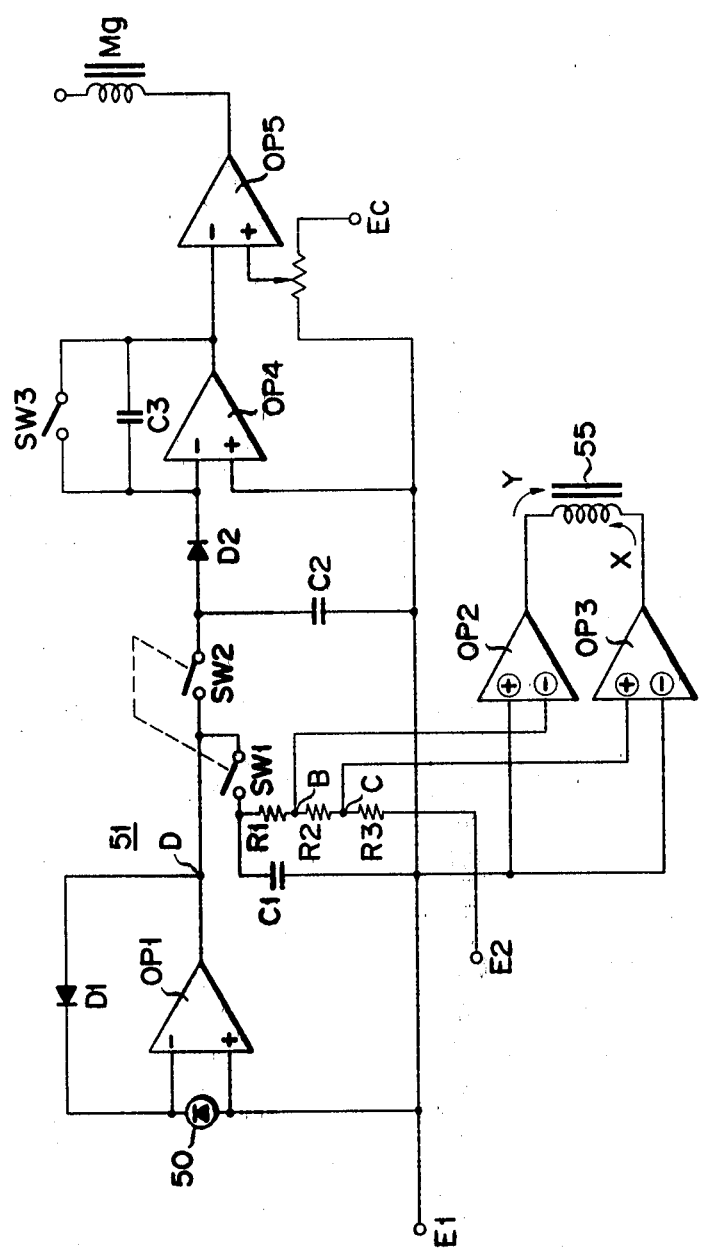
FIG. 8 indicates the drive circuit of the stop control mechanism shown in FIG. 7A.
Figure 9A:
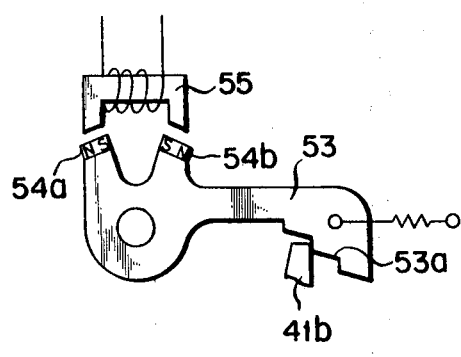
FIGS. 9A to 9C illustrate the manner in which said stop control mechanism is operated.
Figure 9B:
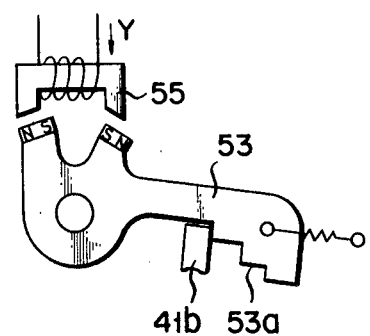
Figure 9C:
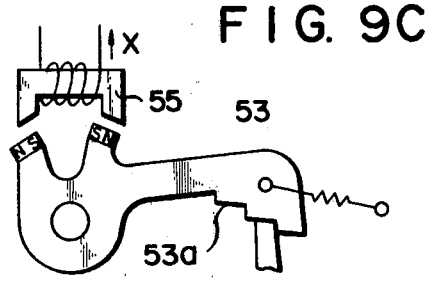

There will now be described by reference to FIG. 8 the operation of the circuitry formed of the light-measuring circuit 17 for actuating various elements including the stop lever control mechanism, judgement circuit 51 and shutter speed control circuit 52. The input terminals of an operation amplifier OP1 are connected to both poles of the light-receiving element 50 which is disposed near the eyepiece in the light path of the finder and receives light from a foreground subject before the mirror 11 swings upward. A log compressing diode D1 for negative feedback is connected between the output terminal of the operation amplifier OP1 and the cathode of the light-receiving element 50. The output terminal of the operation amplifier OP1 is connected to a second referential voltage supply terminal E2 through a normally closed switch SW1 which is opened immediately before the upward swing of the mirror 11 and first to third resistors R1, R2, R3 connected in series in the order mentioned. The output terminal of said operation amplifier OP1 is further connected to a first referential voltage supply terminal E1 through the aforesaid normally closed switch SW2 and capacitor C1. The capacitor C1 is used to delay the operation time of the subject program EE camera by a length of time required for the cam section 41b of the stop lever 41 to ahut against the cam plate 53 after the electromagnet 55 attracts the cam plate 53. The first referential voltage supply terminal E1 is connected to the positive input terminal of a second operation amplifier OP2 and negative input terminal of a third operation amplifier OP3. The negative input terminal of the second operation amplifier OP2 is connected to the junction B of the first and second resistors R1, R2. The positive input terminal of the third operation amplifier OP3 is connected to the junction C of the second and third resistors R2, R3. The electromagnet 55 is connected between the output terminals of the second and third operation amplifiers OP2, OP3. The output terminal D of the first operation amplifier OP1 is impressed with a voltage log compressed in accordance with the degree of brightness of a foreground subject.

Where a foreground subject is brightly illuminated, then a potential between the above-mentioned junctions B, C increases over the potential of the first referential voltage supply terminal E1 of the judgment circuit 51 arranged as described abobve. As a result, current passes through the electromagnet 55 in the direction of an indicated arrow X. Conversely, where a foreground subject is dimly illuminated, then a potential between the aforesaid junctions B, C decreases from the potential of the first referential voltage supply terminal E1. Accordingly, current runs through the electromagnet 55 in the direction of an indicated arrow Y. Where a foreground subject is illuminated with an intermediate degree of brightness, then the junction B has a higher potential then the first referential voltage supply terminal E1. The junction C has a lower potential than said first referential voltage supply terminal E1. Thus depending on the degree of brightness of a foreground subject, the electromagnet 55 has three operation modes, that is, the mode where no current passes, the mode where current runs in one direction, and the mode where current flows in the opposite direction. The cam plate 53 is driven as follows in accordance with the above-mentioned three operation modes of the electromagnet 55. FIG. 9A denotes the case where no current runs through the electromagnet 55, that is, where a foreground subject has an intermediate degree of brightness. In this case, the cam section 41b of the stop lever 41 abuts against the intermediate stepped section of the cam surface 53a of the cam plate 53, causing the stop extent to be set at an intermediate level (as expressed in F-numbers of 5.6, 8).

Where a foreground subject is dimly illuminated, then current flows through the electromagnet 55 in the direction of an arrow Y indicated in FIG. 9B. As a result, the cam plate 53 swings clockwise, causing the cam section 41b of the stop lever 41 to abut against the lowermost stepped section of the cam surface 53a. Accordingly, the stop mechanism 9 reduces a stop aperture only slightly (a stop aperture is substantially fully open, or the stop extent stands at F-number of 2 or 8). Where a foreground subject is brightly illuminated, current presses through the electromagnet 55 in the direction of an arrow X indicated in FIG. 9C. As a result, the cam plate 53 swings counterclockwise, causing the cam section 41b of the stop lever 41 to abut against the uppermost stepped section of the cam surface 53a. Accordingly, the stop mechanism 9 greatly reduces a stop aperture (as expressed in F-numbers of 16, 22).

With the above-mentioned program EE camera of this invention, the stop mechanism is designed to reduce a stop aperture in three stages in accordance with the degree of brightness of a foreground subject.

With the embodiment of FIG. 5, the light receiving element 50 is concurrently used to control the shutter speed. There will now be described by reference to FIG. 8 the operation of said light-receiving element 50 when used for shutter speed control.

The output terminal of the first operation amplifier OP1 is connected to the first referential voltage supply terminal E1 through the normally closed switch SW2 which is opened immediately before the downward swing of the mirror 11 and capacitor C2. Where, therefore, the mirror 11 swings upward, the capacitor C2 is charged with electric energy to an extent corresponding to the degree of brightness which a foreground subject indicates before the upward swing of the mirror 11. The capacitor C2 is connected to the negative input terminals of a fourth operation amplifier OP4 through a log expanding diode D2. An output signal from this fourth operation amplifier OP4 is positively fed back to the inverted input terminal thereof through a capacitor C3 and a third normally closed switch SW3 which is opened at the run of the forward shutter screen. Said capacitor C3 and switch SW3 are connected in parallel. Where, therefore, the forward shutter screen begins to travel, the capacitor C2 is charged with electric energy to an extent corresponding to the degree of brightness of a foreground subject. When the capacitor C2 has a prescribed potential, a magnet $M_g$ for the start of the rear curtain is deenergized through a fifth operation amplifier OP5 to allow for the run of said rear curtain. The positive input terminal of the fourth operation amplifier OP4 is connected to the positive input terminals of the fifth operation amplifier OP5 through the variable resistor 22 whose resistance varies with a stop aperture defined by the stop mechanism 9. Accordingly, the shutter speed is minutely defined in accordance with the defined stop aperture. Reference numeral EC of FIG. 8 denotes a constant current supply terminal.

With the foregoing embodiment, the stop extent or stop aperture was controlled in three stages by the stop control mechanism 15 provided with three stepped sections. It will be noted, however, that the process of controlling the stop extent in a fewer number of stages also falls within the scope of this invention. There will now be described the above-mentioned modification by reference to FIGS. 10A and 10B.

Figure 10A:
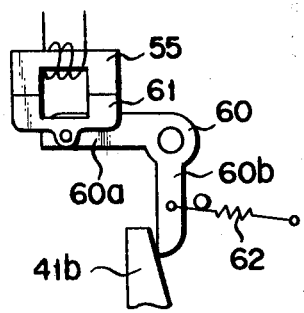
FIGS. 10A and 10B indicate the manner in which a modification of said stop control mechanism is operated.
Figure 10B:
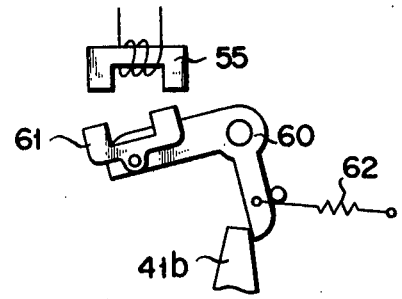

Throughout FIGS. 10A and 10B, reference numeral 60 denotes an L-shaped swingable lever whose intermediate portion is pivotally supported on the substrate and which is used in place of the cam plate. A U-shaped magnetic member 61 is fixed to one arm 60a of the L-shaped lever 60 to face the electromagnet 55. A tension spring 62 is connected to the other arm 60B to urge the L-shaped lever 60 for its counterclockwise swing. The cam section 41b of the stop lever 41 abuts against one side of said other arm 60b. The other arrangements, though not shown, are the same as in the foregoing embodiment.

With the stop control mechanism arranged as described above, the electromagnet 55, when energized, attracts the magnetic member 61. As a result, the L-shaped lever 60 swings clockwise against the urging force of the spring 62. Thus it is possible to control the stop extent in two stages, that is, in one stage where a first stop extent is defined by shifting the cam section 41b of the stop lever 40 (the aperture of the stop is fully opened or the stop extent expressed in the F-number of 2) and is another stage where a second stop extent is determined by the counterclockwise swing of the L-shaped lever 60 due to the action of the spring 62 (the aperture of the stop is reduced to a level expressed in the F-number of 8, 11 or to a maximum level).

A mechanism used in this invention to drive a focal plane shutter at the prescribed shutter speed through a shutter speed control circuit may be of the type well-known in this particular field. There will now be described by reference to FIG. 11 the arrangement and operation of said focal plane shutter-driving mechanism.

The reference numeral 70 denotes a front curtain shaft, and the reference numeral 71 a rear curtain shaft. While the shutter is charged, these shafts 70, 71 are prevented from making a rotation by means of the corresponding levers 72, 73, pins 74a, 75a and gears 74, 75. Where the upward swing of the mirror 11 (FIG. 2) is brought to an end after the depression of a shutter release button, then the lever 72 swings counterclockwise to be disengaged from the pin 74a projectively provided on the gear 74. As a result, the gear 74 is rendered free, and the front curtain is wound about a front curtain cylinder by a charge spring (not shown). Where the capacitor C2 (FIG. 8) has a prescribed potential, the megnet $M_g$ is deenergized. As a result, the lever 73 is pulled by the spring 76 to swing counterclockwise and be disengaged from the pin 75a. At this time the gear 75 is rendered free, and the rear curtain begins to run by the action of a charge spring (not shown). Thus the shutter operation is brought to an end.

With the program EE camera of this invention, the stop extent or F-number is initially defined with a relatively low precision. The shutter speed is determined with a minute precision in accordance with the preset F-number and the measured degree of brightness of a foreground subject. Therefore, the subject program EE camera can be applied to an interchangeable lens type single lens reflex camera with a simple arrangement and at a low cost.

What is claimed is:

1. A program EE single lens reflex camera capable of utilizing various interchangeable lenses having different maximum opening aperture sizes comprising:
   a diaphragm;
   a ring for opening and closing said diaphragm;
   a lever connected to drive said ring;
   a first light measuring circuit including light sensing means for generating a signal proportional to the brightness of a subject;
   diaphragm control means for moving said lever to set the diaphragm opening to one of a few predetermined coarse settings corresponding to about maximum opening, about minimum opening and at least one opening therebetween, depending upon the level of the signal generated by said first light measuring circuit;
   said diaphragm control means comprising a moveable cam plate having a cam surface, a permanent magnet provided on the cam plate, and an electromagnet disposed opposite to said permanent magnet to permit electric currents to flow in opposite directions by a signal from said first light measuring circuit; and
   a second light measuring circuit independent of said first for continuously controlling shutter speed in accordance with brightness of the subject light, including at least one photosensitive means for receiving light from the subject reflected from at least one of a film surface and a shutter blind surface after the light passes through the diaphragm opening set by said control means.

2. A program EE single lens reflex camera capable of utilizing various interchangeable lenses having different maximum opening aperture sizes comprising:
   a diaphragm;
   a ring for opening and closing said diaphragm;
   a lever connected to drive said ring;
   a first light measuring circuit including light sensing means for generating a signal proportional to the brightness of a subject;
   diaphragm control means for moving said lever to set the diaphragm opening to one of a few predetermined coarse settings corresponding to about maximum opening, about minimum opening and at least one opening therebetween depending upon the level of the signal generated by said first light measuring circuit;
   said diaphragm control means comprising a movable cam plate having a cam surface with a few steps and a member having a needle movable by a signal of said first light measuring circuit to be engageable with a predetermined portion of the cam surface such that said movable cam plate is stopped to a position corresponding to the brightness of the light from the subject, the moving position of the diaphragm lever being determined according to the position of said movable cam plate; and
   a second light measuring circuit independent of said first for continuously controlling shutter speed in accordance with brightness of the subject light, including at least one photosensitive means for receiving light from the subject reflected from at least one of a film surface and a shutter blind surface after the light passes through the diaphragm opening set by said control means.

3. A program EE single-lens reflex camera according to claim 1 or 2, in which said lever is controlled in three positions corresponding to a maxium aperture size position, minimum aperture size position and intermediate aperture size position of the diaphragm.

4. A program EE single-lens reflex camera according to claim 1 or 2, in which said second light measuring circuit receives reflected light from a movable reflection mirror which is removed from the photographing optical path at the time of photographing.

5. A program EE single-lens reflex camera according to claim 2 in which diaphragm display marks corresponding to a maximum aperture size, minimum aperture size and intermediate aperture size of the diaphragm are provided in a finder and the needle scans the diaphragm display marks.

* * * * *